(12) United States Patent
Ockerse

(10) Patent No.: US 8,717,433 B2
(45) Date of Patent: May 6, 2014

(54) IMAGE SYNCHRONIZATION FOR A MULTIPLE IMAGER SYSTEM AND METHOD THEREOF

(75) Inventor: Harold C. Ockerse, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 281 days.

(21) Appl. No.: 13/083,772

(22) Filed: Apr. 11, 2011

(65) Prior Publication Data

US 2012/0257045 A1  Oct. 11, 2012

(51) Int. Cl.
*H04N 7/18* (2006.01)

(52) U.S. Cl.
USPC .......................... 348/135; 382/104; 348/148

(58) Field of Classification Search
USPC ........................................................ 348/135
See application file for complete search history.

(56) References Cited

U.S. PATENT DOCUMENTS

| | | | |
|---|---|---|---|
| 6,611,537 B1 | 8/2003 | Edens et al. | |
| 7,103,460 B1 | 9/2006 | Breed | |
| 7,313,467 B2 | 12/2007 | Breed et al. | |
| 7,527,288 B2 | 5/2009 | Breed | |
| 7,768,548 B2* | 8/2010 | Silvernail et al. | 348/148 |
| 2004/0167709 A1* | 8/2004 | Smitherman et al. | 701/208 |
| 2005/0053131 A1 | 3/2005 | Domke et al. | |

FOREIGN PATENT DOCUMENTS

| | | |
|---|---|---|
| EA | 008402 B1 | 4/2007 |
| RU | 19796 U1 | 10/2001 |
| RU | 21467 U1 | 2/2002 |

OTHER PUBLICATIONS

PCT Notification of Transmittal of the International Search Report and the Written Opinion of the International Searching Authority, or the Declaration: Sep. 17, 2012, Pages: All, Switzerland.

* cited by examiner

*Primary Examiner* — Dave Czekaj
*Assistant Examiner* — Md Haque
(74) *Attorney, Agent, or Firm* — Price Heneveld LLP; Scott P. Ryan

(57) ABSTRACT

An imager system and method thereof are provided, the imager system is configured for use with a vehicle and has a plurality of imagers including a first imager having a first field of view, and a second imager having a second field of view The imager system further includes a video processor module configured to approximately synchronize at least the first and second imagers, and a serial data communication connection communicatively connecting the plurality of imagers and the video processor module, wherein at least the first and second imagers are approximately synchronized by communicating a synchronization signal via a connection other than the serial data communication connection, and the images captured by the first and second imagers are approximately synchronized without buffering the captured images.

19 Claims, 8 Drawing Sheets

IMAGE SYNCHRONIZATION FOR A MULTIPLE IMAGER SYSTEM AND METHOD THEREOF

FIELD OF THE INVENTION

The present invention generally relates to an imager system and method thereof, and more particularly, an imager system configured to synchronize at least first and second imagers and method thereof.

BACKGROUND OF THE INVENTION

Generally, vehicles can include one or more cameras to capture images around a vehicle. These images are typically processed, which includes buffering, so that a vehicle function can be performed based upon the captured images.

SUMMARY OF THE INVENTION

According to one aspect of the present invention, an imager system configured for use with a vehicle is provided, the imager system having a plurality of imagers including a first imager having a first field of view, and configured to capture an image of at least a portion of the first field of view, and a second imager having a second field of view, and configured to capture an image of at least a portion of the second field of view, wherein the first field of view is approximately adjacent to the second field of view. The imager system further includes a video processor module configured to approximately synchronize at least of the first and second imagers, and further configured to process the captured images to be at least one of displayed and used to control a vehicle component, and a serial data communication connection communicatively connecting the plurality of imagers and the video processor module, wherein at least of the first and second imagers are approximately synchronized by communicating a synchronization signal via a connection other than the serial data communication connection, such that the images captured by the first and second imagers are approximately synchronized without buffering the captured images.

According to another aspect of the present invention, an imager system configured for use with a vehicle is provided, the imager system having a plurality of imagers including a first imager having a first field of view, and configured to capture an image of at least a portion of the first field of view, and a second imager having a second field of view, and configured to capture an image of at least a portion of the second field of view, wherein the first field of view is approximately adjacent to the second field of view. The imager system further includes a video processor module configured to approximately synchronize at least of the first and second imagers, and further configured to process the captured images to be at least one of displayed and used to control a vehicle component, wherein an asynchronous communication backchannel is used in a closed loop to generate a synchronization signal locally at the first and second imagers, and at least the first and second imagers are approximately synchronized.

According to yet another aspect of the present invention, an imager system configured for use with a vehicle is provided, the imager system includes a video processor module configured to be in communication with a plurality of imagers, the video processor module configured to approximately synchronize at least a portion of the plurality of imagers, and a low-voltage differential signaling communication connection of the video processor module, such that the video processor module is configured to be communicatively connected to at least a portion of the plurality of imagers, wherein at least a portion of the plurality of imagers are approximately synchronized without communicating a synchronization signal via the low-differential signaling communication connection, and images captured by the plurality of imagers are approximately synchronized without buffering the captured images.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

Figure 1A:
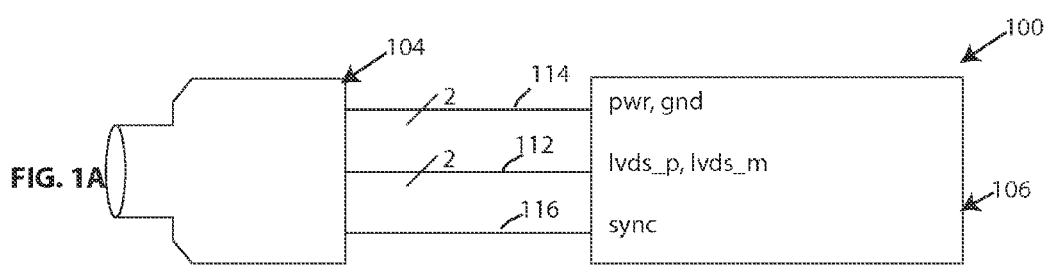
FIG. 1A is a block diagram of an imager system, in accordance with one embodiment of the present invention.

The present illustrated embodiments reside primarily in combinations of method steps and apparatus components related to an imager system and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 7:
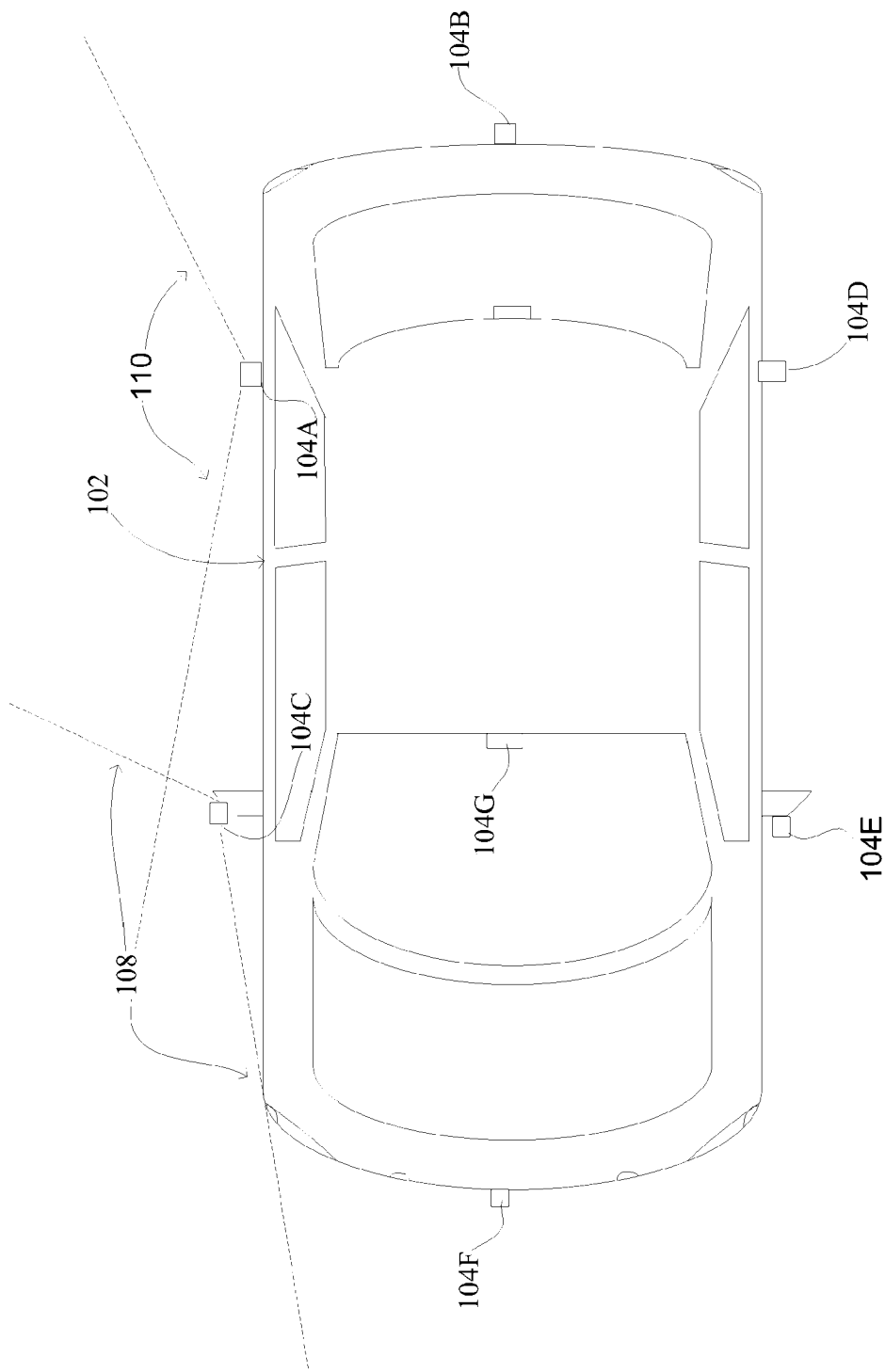
FIG. 7 is an environmental diagram of an imager system configured for use with a vehicle, in accordance with one embodiment of the present invention.

In reference to FIGS. 1A-2 and 7, an imager system is generally shown at reference identifier 100. The imager system 100 can be configured for use with a vehicle generally indicated at reference identifier 102 (FIG. 7). The imager system 100 can include a plurality of imagers generally indicated at reference identifier 104, and a video processor module generally indicated at reference identifier 106. The plurality of imagers can include a first imager 104A having a first field of view 108 and configured to capture an image of at least a portion of the first field of view 108, and a second imager 104B having a second field of view 110 and configured to capture an image of at least a portion of the second field of view 110, wherein the first field of view 108 is approximately adjacent to the second field of view 110. The video processor module 106 can be configured to approximately synchronize at least of the first and second imagers 104A, 104B, and be further configured to process the captured images to be at least one of displayed and used to control a vehicle component. The imager system 100 can include a serial data communication connection 112 communicatively connecting the plurality of imagers 104 and the video processor module 106, wherein at least the first and second imagers 104A, 104B are approximately synchronized by communicating a synchronization signal via a connection other than the serial data communication connection 112, and the images captured by the first and second images are approximately synchronized without buffering the captured images, as described in greater detail herein.

By way of explanation and not limitation, the imager system 100 can be configured for use with the vehicle 102 for displaying an image of a scene proximate or surrounding the vehicle 102, for performing analytic operations, the like, or a combination thereof. To perform such exemplary functions, it can be beneficial to have at least a portion of the plurality of imagers synchronized rather than buffering the captured images and causing latency in the imager system 100. As an imaged scene becomes increasingly dynamic (e.g., as objects transition more quickly through the imaged scene), imager synchronization can be beneficial to reduce memory needed for buffering, latency due to buffering, aligning or splicing image data, the like, or a combination thereof. Thus, synchronization may be less critical when the vehicle 102 is moving slowing because changes in the imaged scene are reduced; however, when the vehicle 102 is moving at a greater speed the changes in the imaged scene increase, and approximate synchronization of the imagers allows for the captured images to be displayed with a reduced amount of perceived errors in the image, allow for enhanced performance of analytic operations, the like, or a combination thereof.

Typically, a master synchronization signal is communicated to at least a portion of the plurality of imagers for tracking. The synchronization signal can be communicated from a video stream consumer (e.g., the video processor module 106) rather than one of the plurality of imagers 104 to reduce signal routing complexity, provide enhanced data processing, the like, or a combination thereof. Thus, the imager system 100 can be configured to control frame (e.g., image) start timing for two or more imagers 104A, 104B . . . etc., and/or the synchronization signal communicated to at least a portion of the plurality of imagers 104 can be individually phase shifted to account for video transmission delays.

Figure 1B:
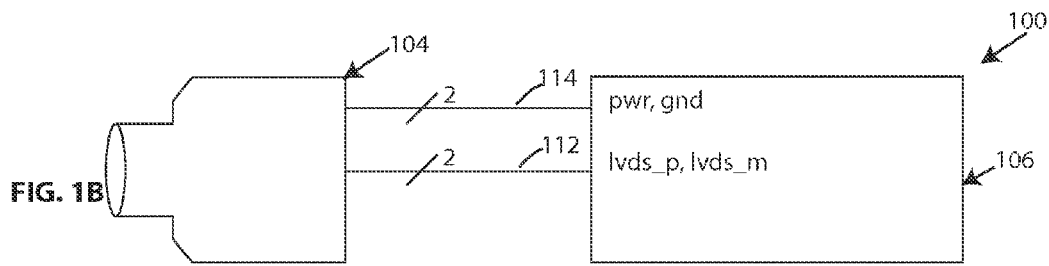
FIG. 1B is a block diagram of an imager system, in accordance with one embodiment of the present invention.
Figure 1C:
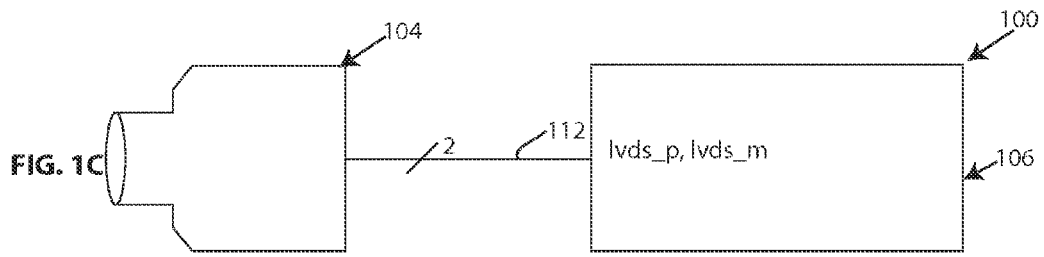
FIG. 1C is a block diagram of an imager system, in accordance with one embodiment of the present invention.

With respect to embodiments illustrated in FIGS. 1A-1C, the imager system 100 includes the serial data communication connection 112 and power and ground connections 114 (FIGS. 1A and 1B). It should be appreciated by those skilled in the art the power and ground connections 114 illustrated in FIGS. 1A-1C are two wire connections. The serial data communication connection 112 can be a parallel differential data communication connection, such as, but not limited to, a low-voltage differential signaling connection; however, it should be appreciated by those skilled in the art that other suitable data communication connections can be used, wherein typically that data communication connection is configured so regular communication can occur between the imager 104 and the video processor module 106. Typically, bandwidth of the serial data communication connection 112 is substantially consumed by transmission of data, and in some embodiments, power and data. Thus, synchronization information cannot be communicated via the serial data communication connection 112.

As to an embodiment illustrated in FIG. 1A, the imager system 100 further includes a dedicated synchronization communication connection 116 communicatively connecting one of the plurality of imagers 104 and the video processor module 106, wherein a synchronize signal is communicated via the dedicated synchronization communication connection 116. Each of the first and second imagers 104A, 104B can be directly or indirectly (e.g., via an intermediate imager) connected to the video processor module 106 by the dedicated synchronization communication connection 116, according to one embodiment.

Figure 2:
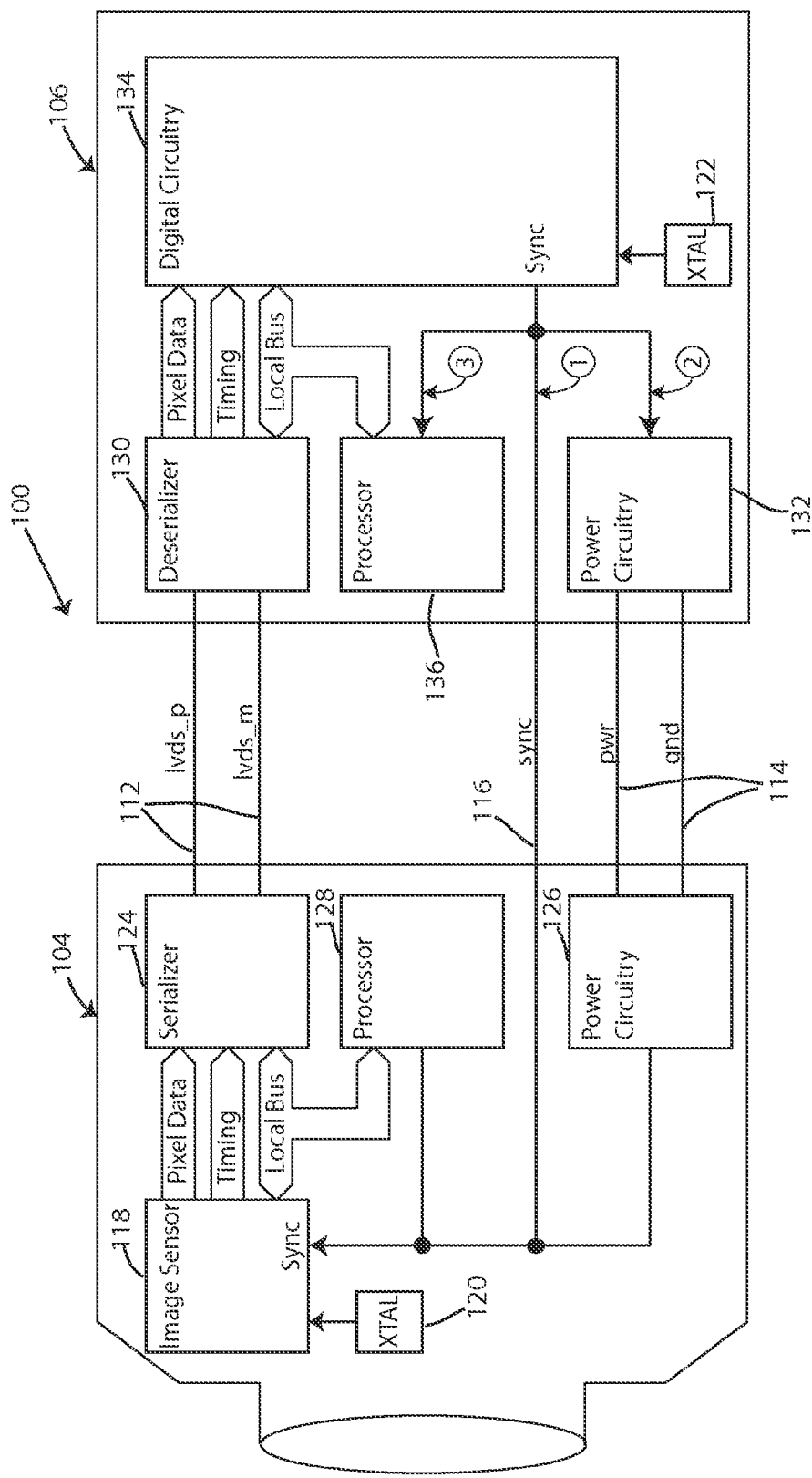
FIG. 2 is a block diagram of an imager system illustrating various embodiments of the present invention.

In regards to FIGS. 1A and 2, the signal path when the imager system 100 includes the dedicated synchronization communication connection 116 is generally identified at (1) in FIG. 2.

According to an embodiment illustrated in FIG. 1B, the imager system 100 includes the power and ground connections 114 that communicatively connects at least one of the plurality of imagers 104 and the video processor module 106, wherein a synchronize signal is communicated via the power and ground connections 114. Each of the first and second imagers 104A, 104B can be directly or indirectly (e.g., via an intermediate imager) connected to the video processor module 106 by the power and ground connections 114, according to one embodiment.

As to FIGS. 1A and 1B, the signal path for the synchronization signal in such an embodiment is generally identified at (2) in FIG. 2. Typically, electrical power supplied to the imager 104 is direct current (DC) electrical power, and the synchronization signal can be a pulsed signal communicated via the power and ground connections 114. In such an embodiment, the synchronize signal is communicated as a pulse on top of the DC voltage of the power connection.

With respect to an embodiment illustrated in FIG. 1C, the imager system 100 includes the serial data communication connection 112. Since the bandwidth of the serial data communication connection 112 is typically substantially consumed with transmission of power and data, the synchronization signal cannot be communicated via the serial data communication connection 112, and at least a portion of the plurality of imagers 104 can be synchronized with the video processor module 106 via a back-channel communication. The signal path for the synchronization signal in such an embodiment is generally identified at (3) in FIG. 2. Thus, synchronization is achieved by an asynchronous communication backchannel used in a closed loop fashion to generate a synchronization signal locally at one or more of the plurality of imagers 104.

According to one embodiment, as illustrated in FIG. 2, at least one of the plurality of imagers 104 can include an image sensor 118 configured to capture video information using a clock 120 (e.g., a crystal clock) for a timing reference. The clock 120 can be configured to set a timing frequency for a video stream, wherein it is a frequency difference between individual imager clock 120 and a reference clock 122 of the video processor module 106 that causes relative frame drift. The imager illustrated in FIG. 2 can also include a serializer 124 configured to transmit data over the serial data communication connection 112, power circuitry 126 that can be configured to filter and establish proper imager 104 power levels, and a processor 128 adapted to configure the image sensor 118 and the serializer 124 and generate a local synchronization timing signal for image sensor 118. The system synchronization timing signal generated by the digital circuitry 134 can be communicated via the synchronization communication connection 116 (FIG. 1A), the power and ground connections 114 (FIG. 1B), or the backchannel (FIG. 1C). It should be appreciated by those skilled in the art that one or more imagers of the plurality of imagers 104 can include the above-described components, additional components, alternative components, or a combination thereof.

The video processor module 106, according to one embodiment, can include a deserializer 130 that corresponds to the serializer 124 of the imager 104, power circuitry 132 that can be configured to filter and establish a power level for the video processor module 106 and/or the one or more imagers 104, and digital circuitry 134 configured to perform timing functions to synchronize frames from two or more of the plurality of imagers. The video processor module 106, as illustrated in FIG. 2, can also include the clock 122 configured as a reference clock for the digital circuitry 134, and a processor 136 configured to perform timing related calculations and communicate timing measurement information to at least a portion of the plurality of imagers 104. The imager system 100 can include a plurality of video processor modules, wherein video processor modules subsequent to, and in communication with, a portion of the plurality of imagers and/or the video processor module 106, can be configured to consume synchronized frames. Additional deserializers 130 and optionally additional power circuitry 132 can be applied to a video processor module 106 to support additional imagers 104. It should be appreciated by those skilled in the art that one or more video processor modules 106 can include the above-described components, additional components, alternative components, or a combination thereof.

Figure 3A:
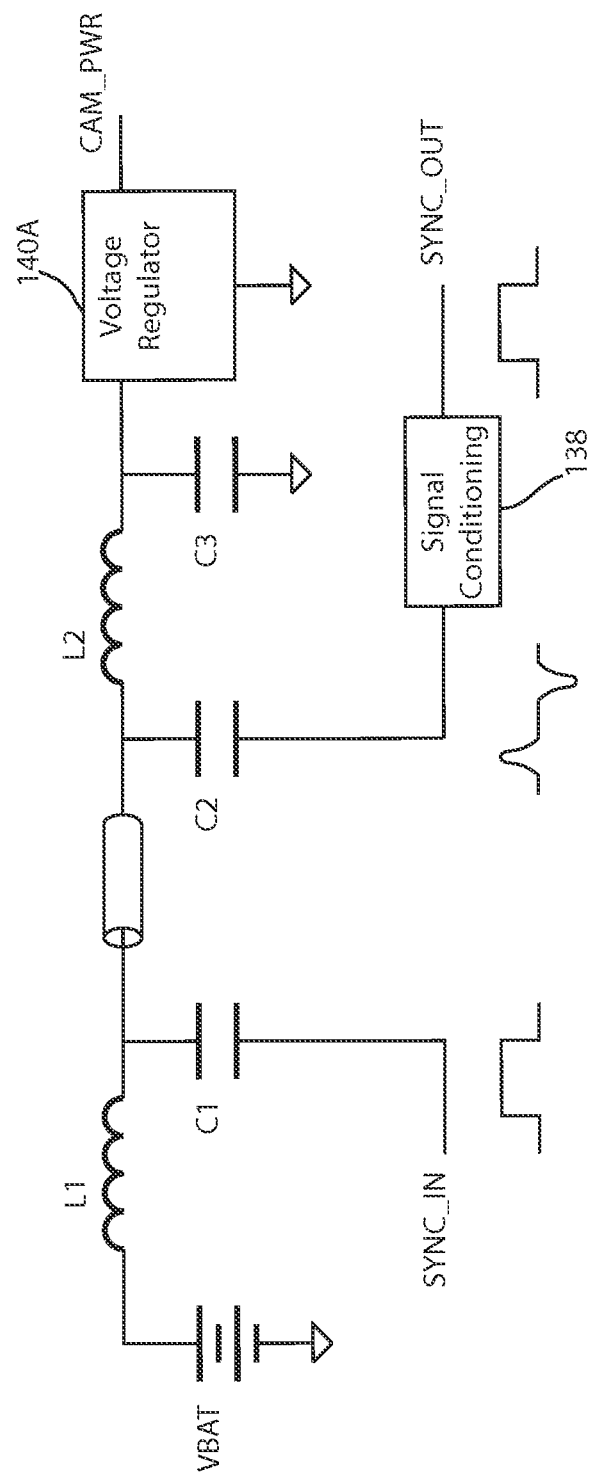
FIG. 3A is a circuit schematic of a circuit configured to communicate a synchronization signal utilizing power and ground connections, in accordance with one embodiment of the present invention.
Figure 3B:
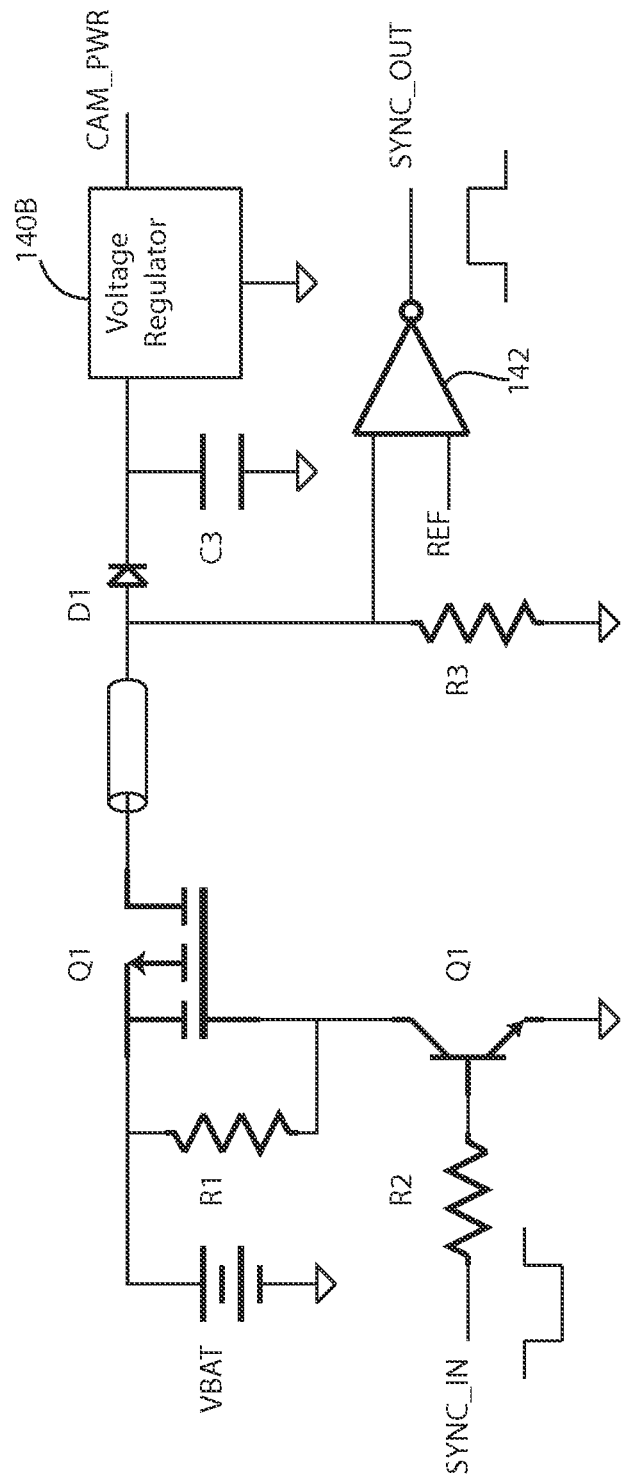
FIG. 3B is a circuit schematic of a circuit configured to communicate a synchronization signal utilizing power and ground connections, in accordance with one embodiment of the present invention.

With respect to FIGS. 3A and 3B, these figures illustrate two examples of circuitry (e.g., power circuitry 126 of the imager and power circuitry 132 of the video processor module 106) configured for communicating a synchronization signal via the power and ground connections 114. As illustrated in FIG. 3A, the circuitry can be configured to leverage a DC nature of the power connection by including a pulse on top of the DC voltage. According to one embodiment, the pulse is injected through a coupling capacitor C1, and is sensed through a coupling capacitor C2. A signal condition circuit 138 can be included in the circuitry, wherein the signal condition circuit 138 can be configured to reshape or sample the sensed signal and output a digital pulse with limited time delay. The circuitry of FIG. 3A can also include an inductor L1, and inductor L2, and a capacitor C3, wherein the inductor L1 and the combination inductor L2 and capacitor C3 can be configured to block the signal and substantially prevent it from influencing the power circuitry 126, 132. A voltage regulator 140A of the exemplary circuit of FIG. 3A can be included in an imager and configured to remove residual signal noise to supply a substantially clean power output CAM_PWR.

As exemplary illustrated in FIG. 3B, the circuitry can be configured such that an application of imager power is controlled by an input signal SYNC_IN. The circuitry of FIG. 3B can include a voltage regulator 140B in the imager 104 to reduce a voltage level and transient noise, a diode D1 in series configured to disconnect an input power from a capacitor C3 during a drop in voltage, and the power supplied to the circuit can be adapted so that power is removed anytime the input signal SYNC_IN is low. The capacitor C3 can be configured to hold up an input voltage temporarily when power is removed, which can allow the voltage regulator 140B to remain operational. As long as this duration is shorter than a predetermined time period, regulation of the output voltage CAM_PWR can be maintained. The circuit of FIG. 3B can also include an inverting comparator 142 configured to detect a drop in input voltage thereby generating a local synchronization signal SYNC_OUT.

There can be advantages to controlling power individually to at least a portion of the plurality of imagers 104. By way of explanation and not limitation, one advantage can be that a system with the plurality of imagers 104 that does not require all imagers to operate continuously can power down one or more imagers in order to reduce power. Another exemplary advantage can be that a power cycle could be used to reset a single camera to correct a fault or change a configuration. A system requirement for individual camera power control can be leveraged to transmit the synchronization signal.

With respect to an exemplary embodiment illustrated in FIG. 1C, data (e.g., video data) can be serialized at the imager 104 (e.g., serializer 124) and transmitted to the video processor module 106, which is configured to deserialize (e.g., deserializer 130) and communicated to the processor 136. Typically, serializer/deserializer chipsets (SerDes chipsets) can be configured for backchannel communication, wherein data can be sent from the video processor module 106 to the imager (e.g., from the deserializer 130 to the serializer 124). The SerDes can be configured to transmit backchannel data substantially continuously, or the SerDes can be configured to transmit backchannel data during data (e.g., video data) blanking periods.

For purposes of explanation and not limitation, the SerDes can be MAXIM™ part number MAX9257, MAXIM™ part number MAX9258, or INTERSILT™ part number ISL76321.

Figure 4:
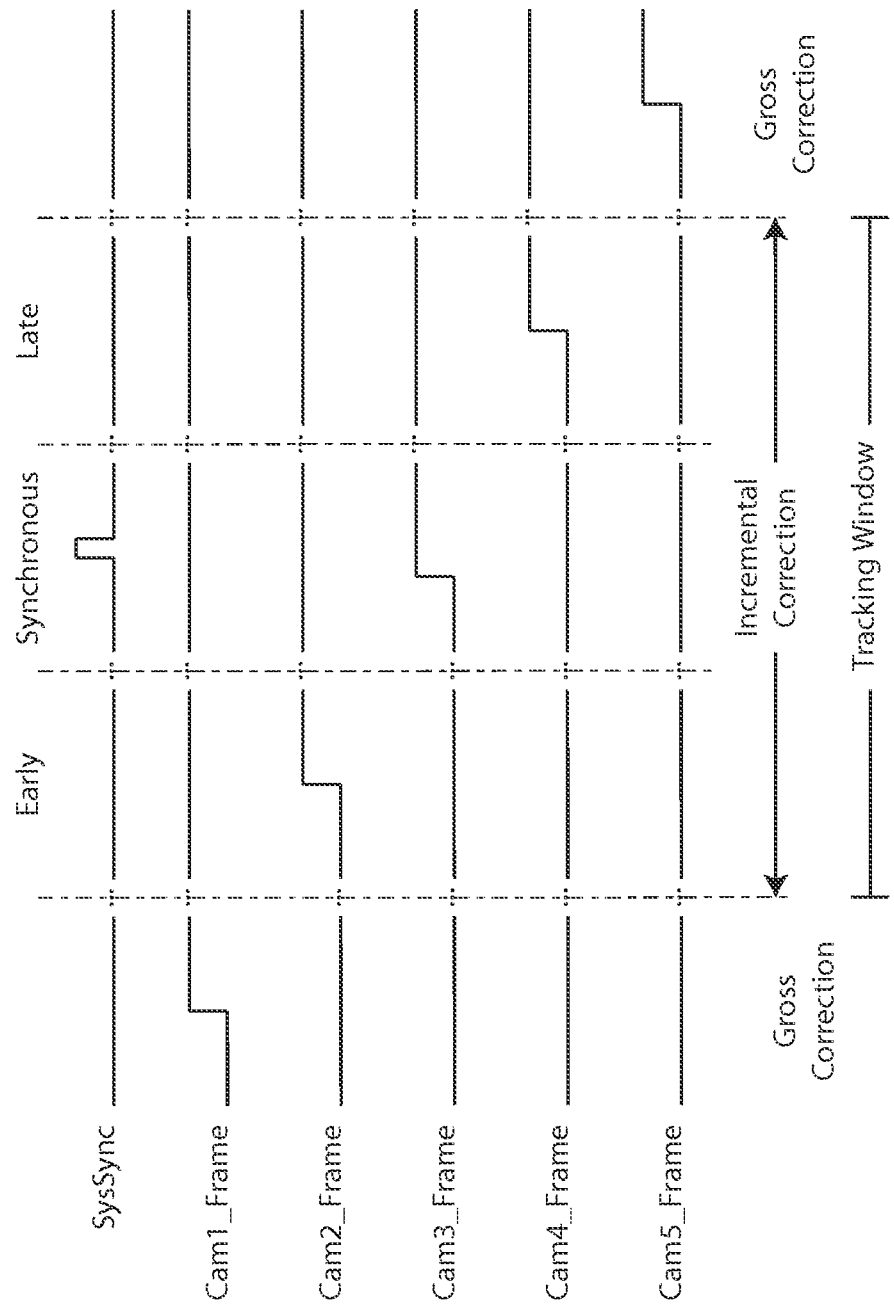
FIG. 4 is a timing diagram, in accordance with one embodiment of the present invention.

In regards to FIGS. 1C and 4, the timing diagram of FIG. 4 illustrates frame timing from five (5) imagers with unique synchronization states relative to a system generated timing pulse, according to one embodiment. Video data can be transmitted when the frame signal is high. The digital circuitry 134 of the video processor module 106 can generate a signal SysSync. In this example, Cam1_Frame occurs too early relative to SysSync to use, and thus, requires a gross correction to achieve valid frame timing. Cam2_Frame occurs too early, but is close enough in timing to still be used. An incremental adjustment can be applied to Cam2_Frame to reduce the error. Cam3_Frame is synchronized to SysSync and no correction is necessary; however, an incremental correction can be applied to Cam3_Frame depending upon where Cam3_Frame is within the synchronous portion of a tracking window. Cam4_Frame occurs too late, but is close enough in timing to be used. An incremental adjustment can be applied to reduce the error. Cam5_Frame occurs too late to be used, and requires a gross correction to achieve valid frame timing. The gross correction applied to Cam1_Frame and Cam5_Frame is greater than the incremental correction applied to Cam2_Frame, Cam4_Frame, and optionally to Cam3_Frame, according to one embodiment. Alternatively, rather than applying the greater correction to Cam1_Frame and Cam5_Frame, these frames can be disregarded. The gross correction value and/or the incremental correction value can be predetermined values, variable values, or a combination thereof.

Figure 5:
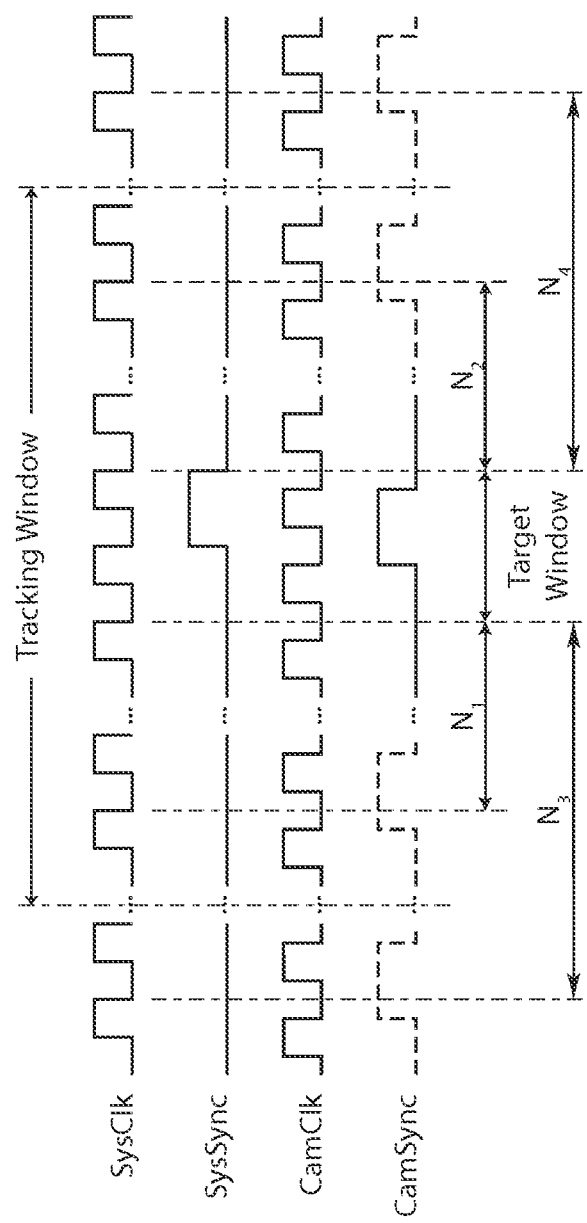
FIG. 5 is a timing diagram, in accordance with one embodiment of the present invention.

As to FIGS. 1C and 5, the timing diagram of FIG. 5 illustrates timing for each of the five (5) timing states illustrated in FIG. 4, according to one embodiment. A system synchronization pulse SysSync can be generated based upon the system clock SysClk (e.g., the clock 122 of the video processor module 106). The imager synchronization pulse CamSync can be generated based upon the camera clock CamClk (e.g., the clock 120 of the imager), which can be coincident with the start of an image (e.g., a frame) referenced previously. A tracking window can be based upon the allowable synchronization error, which is typically determined by an amount of allocated pixel buffering that in turn is determined by system performance, cost constraints, the like, or a combination thereof. Additionally or alternatively, the synchronization error can be a fixed value or a variable value that is adjusted based upon operating characteristics, such as, but not limited to, a speed of the vehicle 102.

With continued reference to FIGS. 1C and 5, $N_1$ and $N_2$ can represent a number of early and late clock cycles, respectively, when CamSync occurs within the tracking window, and $N_3$ and $N_4$ can represent the number of early and late clock cycles, respectively, when CamSync occurs outside the tracking window. $N_{CAM}$ can represent a count based upon imager clock cycles (e.g., clock 120), and $N_{SYS}$ can represent a count based upon system clock cycles (e.g., clock 122). For purposes of explanation and not limitation, each cycle of SysClk can represent one (1) pixel for the video processing module 106, and each cycle of CamClk can represent one (1) pixel for the imager.

In regards to FIGS. 1C and 4-6, a period of one (1) system frame $T_{SYS}$ has units of SysClk, and one imager frame $T_{CAM}$ has units of CamClk. According to one embodiment, a reference (e.g., an ideal) frame period $T_{REF}$ can be calculated by dividing a reference (e.g., an ideal) clock crystal RefClk frequency by a desired frame rate in units of frames-per-second (fps). A high-end threshold (e.g., maximum) for expected timing error FrameShift over a single frame cycle between the video processor module 106 and the imager frame can be approximately directly proportional to a high-end threshold (e.g., maximum) oscillator frequency difference typically measured in parts-per-million (ppm). Typically, any frame-to-frame correction can be less than FrameShift.

The video processor module 106 can be configured to measure and report timing information to at least a portion of the plurality of imagers. According to one embodiment, to simplify calculations and/or processing, $T_{SYS}$ can be set equal to $T_{REF}$, which can have an effect of placing approximately a full error burden on $T_{CAM}$. The detection window for CamSync can begin approximately half a frame before the target window and proceed until found, and the number of CamClk cycles $N_{CAM}$ can be recorded once found. The value of clock cycles counted can be positively signed if occurring approximately before the target window, and negatively signed if occurring approximately after the target window. The value of $T_{CAM}$ measure from the prior SysSync pulse to the current SysSync pulse can also be recorded. Correction processing can then take place either within the video processor module 106 or within the imager 104. For purposes of explanation and not limitation, one or more embodiments are described herein as the imager 104 being configured to perform correction processing; however, it should be appreciated by one having ordinary skill in the art that a portion or all of the processing can be performed in the imager, the video processor module 106, or a combination thereof. The recorded values of $N_{SYS}$ and $T_{CAM}$ can be reported to the imager 104 as signed thirty-two (32) bit integers if they are determined along with a rolling eight (8) bit counter value. The latter may be used to maintain a time base since some back channel methods only support nondeterministic asynchronous communication.

According to one embodiment, with respect to the video processor module 106, SysClk can be representative of a clock derived from a video processor module crystal oscillator, SysSync can be representative of a reference pulse at a start of an image frame derived from SysClk, $T_{SYS}$ can be representative of one camera frame period based upon SysClk, RefClk can be representative of an ideal (e.g., reference) system with approximately no frequency error, $T_{REF}$ can be representative of one (1) image frame period based upon RefClk, and FrameShift can be representative of a difference in timing between SysSync and CamSync. In regards to the imager 104, CamClk can be representative of a clock derived from a pixel clock (e.g., an imager module crystal oscillator), CamSync can be representative of a pulse at a start of an image frame derived from CamClk, $T_{CAM}$ can be representative of one (1) camera frame period based upon CamClk, $N_{CAM}$ can be representative of FrameShift in CamClk units where a positive value indicates an early CamSync and negative indicates late, SyncTimer can be representative of a timer incrementing on CamClk and rolling over on $T_{SYNC}$, and $T_{SYNC}$ can be representative of a period of SyncTimer. Typically, both CamClk and CamSync can be available to the video processor module 106, since the pixel clock and frame timing are provided with the image data.

For purposes of explanation and not limitation, RefClk can equal twelve megahertz (12 MHz), $T_{REF}$ can equal 400,000 clocks/frame, a maximum oscillator frequency error can equal $+/-100 \times 10^{-6}$, and a frequency difference can be |SysClk−CamClk|≤2400 Hz, which results in a maximum FrameShift equaling 6.665 is or about eighty (80) pixels. This can mean that the SyncTimer may have to add or subtract up to eighty (80) pixels from a nominal reference period for the imager 104 and the video processing module 106 to remain synchronized. Thus, adding or subtracting an integer value from SyncTimer can adjust a phase of CamSync, and/or adding or subtracting an integer value from $T_{SYNC}$ can adjust a period of CamSync.

Figure 6:
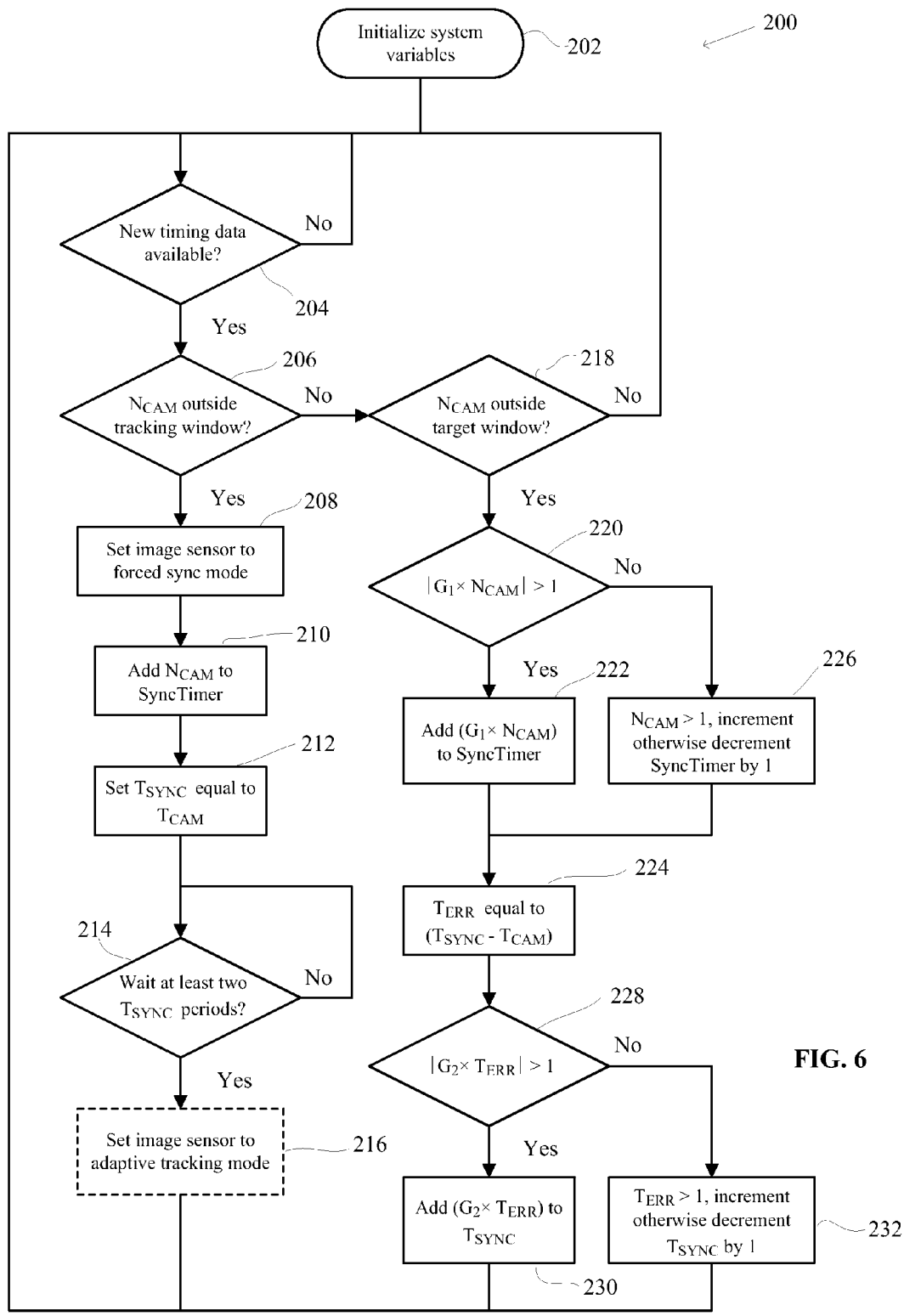
FIG. 6 is a flow chart illustrating a method of synchronizing at least two imagers of an imager system, in accordance with one embodiment of the present invention.

A method of correction processing is generally shown in FIG. 6 at reference identifier 200. The method 200 can initialize system variables at step 202. Typically, imager variables and register settings are initialized based upon reference timing at power on (e.g., start-up of the system 100, which can be, but is not limited to, the time the vehicle 102 is turned on). The method 200 can then proceed to decision step 204, wherein it is determined if new timing data is available. If it is determined at decision step 204 that new timing data is not available, then the method 200 can return to step 204. However, if it is determined that new timing data is available at decision step 204, the method 200 can proceed to decision step 206. Typically, the imager sensor 118 is initially set to adaptive tracking mode with synchronization timing provided by the processor 128, wherein in adaptive tracking mode, frame rate controls internal to the image sensor 118 add or subtract single clock cycles from the frame time in order to keep the sensor in synchronization. Alternatively, the processor 128 can be configured to perform timing adjustments through the image sensor 118 register writes can also perform this logic.

At decision step 206, it is determined if $N_{CAM}$ is outside the tracking window. If it is determined at decision step 206 that $N_{CAM}$ is outside the tracking window, then the method 200 proceeds to step 208. According to one embodiment, on receipt of a new set of timing measurements, a determination can be made about a relative timing difference between the CamSync and SysSync signals. If CamSync falls outside the tracking window, then the data stream (e.g., video stream) is out of synchronization and can be unusable for processing.

At step 208, the image sensor 118 can be set to force synch mode. Typically, in this mode, the out-of-sync bit is asserted. The method 200 can then proceed to step 210, wherein $N_{CAM}$ is added to SyncTimer, and at step 212, $T_{SYNC}$ is set equal to $T_{CAM}$. According to one embodiment, $T_{SYNC}$ can be a time period for the processor 128 synchronization pulse, and SyncTimer can be a timer internal to the processor 128 that is used to generate the synchronization pulse, so SyncTimer has time period $T_{SYNC}$. The phase of SyncTimer can be modified by $N_{CAM}$, and then the period can be set to $T_{CAM}$.

A period of time can be allowed to pass before looking for new timing data, according to one embodiment. At decision step 214 it is determined if the method 200 has waited at least two (2) $T_{SYNC}$ periods. If it is determined at decision step 214 that the method 200 has not waited at least two (2) $T_{SYNC}$ periods, then the method 200 returns to step 214. However, if it is determined at decision step 214 that the method 200 has waited at least two (2) $T_{SYNC}$ periods, then the method 200 returns to step 204, or alternatively can proceed to optional step 216 (shown in phantom). At step 216 the image sensor 118 can be set to adaptive tracking mode, and the method 200 can then return to step 204. A rolling eight (8) bit counter value can be used to facilitate a delay timing. By way of explanation and not limitation, waiting some amount of time can allow for measurement stabilization, to account for data reporting delays, the like, or a combination thereof.

Thus, the image sensor 118 can be configured to adaptive tracking mode once stabilized. Also, the correction of timer phase and period can result in subsequent updates being located within the tracking window. Incremental corrections can be used subsequently to keep CamSync approximately within the tracking window as relative frequency differences between the two clock references slowly change. According to one embodiment, an incremental correction can be any correction that is less than a gross correction.

If it is determined at decision step 206 that $N_{CAM}$ is not outside the tracking window, the method 200 can proceed to decision step 218, wherein it is determined if $N_{CAM}$ is outside the target window. If it is determined at decision step 218 that $N_{CAM}$ is not outside the target window, then the method 200 can return to step 204. However, if it is determined at decision step 218 that $N_{CAM}$ is outside the target window, then the method 200 proceeds to decision step 220, wherein it is determined if an absolute value of $Gain_1$ multiplied by $N_{CAM}$ is greater than one (1) ($|G_1 \times N_{CAM}|>1$). If it is determined at decision step 220 that an absolute value of $Gain_1$ multiplied by $N_{CAM}$ is greater than one (1) ($|G_1 \times N_{CAM}|>1$), then the method 200 can proceed to step 222. At step 222, $Gain_1$ multiplied by $N_{CAM}$ ($G_1 \times N_{CAM}$) is added to SyncTimer, and at step 224 $T_{ERR}$ is set to be equal to $T_{SYNC}$ minus $T_{CAM}$.

However, if it is determined at decision step 220 that an absolute value of $Gain_1$ multiplied by $N_{CAM}$ is not greater than one (1) ($|G_1 \times N_{CAM}|<1$), then the method 200 can proceed to step 226. At step 226, if $N_{CAM}$ is greater than one (1), then SyncTimer can be incremented by a value (e.g., a value of one (1)); otherwise SyncTimer can be decremented by a value (e.g., a value of one (1)). The method 200 can proceed from step 226 to step 224, and then the method 200 can proceed from step 224 to decision step 228.

At decision step 228, it is determined if an absolute value of $Gain_2$ multiplied by $T_{ERR}$ is greater than one (1) ($|G2 \times T_{ERR}|>1$). If it is determined at decision step 228 that an absolute value of $Gain_2$ multiplied by $T_{ERR}$ is greater than one (1) ($|G2 \times T_{ERR}|>1$), then the method 200 can proceed to step 230. At step 230, $Gain_2$ multiplied by $T_{ERR}$ can be added to $T_{SYNC}$, and method 200 can then return to step 204. However, if it is determined at decision step 228 that an absolute value of $Gain_2$ multiplied by $T_{ERR}$ is not greater than one (1) ($|G2 \times T_{ERR}| \leq 1$), then the method 200 can proceed to step 232. At step 232, if $T_{ERR}$ is greater than one (1), then $T_{SYNC}$ can be incremented by a value (e.g., a value of one (1)); otherwise, $T_{SYNC}$ can be decremented by a value (e.g., a value of one (1)), and the method 200 can return to step 204.

An incremental adjustment can be applied when CamSync drifts out of the target window, and gain multipliers $G_1$ and $G_2$ can be introduced. Typically, $G_1$ and $G_2$ are assigned an empirically determined non-zero value to achieve desired system dynamic response. The gain multipliers can also be individually adjusted over time to account and correct for timing perturbations (e.g., unexpected and/or large perturbations) that remain within the tracking window. According to one embodiment, the values of $G_1$ and $G_2$ are different. Additionally or alternatively, as with correction, both the phase and period of SyncTimer can be adjusted. A minimum incremental adjustment of one CamClk period is ensured for cases when either gain multiplier is defined as less than one (1).

By way of explanation and not limitation, in operation, one or more imagers can be mounted (e.g., removably connected, not removably connected, attached, integrated, etc.) to an exterior and/or interior of the vehicle 102. The captured images (e.g., video) can be used for direct presentation to an occupant of the vehicle 102 via a video display, for performing video analytics to detect objects and situations that may be of interest to an occupant of the vehicle 102, the like, or a combination thereof. Situational video can be displayed during certain vehicle 102 operations, such as, but not limited to, rear camera display when the vehicle 102 is in reverse, during parking maneuvers, when the vehicle 102 is making lane changes, the like, or a combination thereof. An exemplary device is described in U.S. Patent Application Publication No. 2008/0068520, entitled "VEHICLE REARVIEW MIRROR ASSEMBLY INCLUDING A HIGH INTENSITY DISPLAY," the entire disclosure of which is hereby incorporated herein by reference. Alternatively, the video can be displayed substantially continuously supplementing, or even supplanting, existing mirror-based vision solutions.

Combinational video display opportunities when two or more imagers are placed to view around the vehicle 102. The video from two or more imagers can be combined to form a panoramic view, which can be used for blind zone awareness. The video from multiple imagers (e.g., four or more imagers) can be combined to provide a surround view (e.g., top view, bird's eye view).

Exemplary imagers and/or imager systems are describe in U.S. Patent Application Publication Nos. 2008/0192132, entitled "IMAGING DEVICE," 2009/0256938, entitled "IMAGING DEVICE," 2009/0160987, entitled "IMAGING DEVICE," 2009/0190015, entitled "IMAGING DEVICE," 2010/0187407, entitled "IMAGINING DEVICE," and 2010/0188540, entitled "IMAGING DEVICE," and U.S. patent application Ser. No. 13/034,748, entitled "AUTOMATIC VEHICLE EQUIPMENT MONITORING, WARNING, AND CONTROL SYSTEM," the entire disclosures of which are hereby incorporated herein by reference.

Typically, vehicles that include a camera include analog connections (e.g., National Television System Committee (NTSC)). Vehicles that include a camera that transmits captured video through a digital connection are generally free running and send the video data at thirty (30) fps, and include frame buffering techniques to support operations where asynchronous video streams from multiple cameras are combined for presentation as a single displayable video stream.

The imager system 100 can include the plurality of imagers 104 configured to capture imagers and communicate the image data digitally, which can be used for video viewing, performing analytic operations, the like, or a combination thereof. As the vehicle 102 speed increases, it benefits of receiving synchronized captured images increases, since the scene becomes more dynamic. The field of view 108, 110 of the first and second imager 104A, 104B can become increasingly more dynamic as objects transition more quickly through the field of view 108, 110 (e.g., scene). Thus, as objects transition between individual imager 104A, 104B views 108, 110, it can be advantageous to have the captured imagers (e.g., frames) approximately synchronized for enhanced subsequent display and/or analytic operations. According to one embodiment, the fields of view 108, 110 can be approximately adjacent, such that the fields of view 108, 110 are non-overlapping, but have no gap (e.g., non-imaged area) separating the two, are partially overlapping, or are non-overlapping and have a gap (e.g., non-imaged area) separating the two.

FIG. 7 illustrates various examples of imager 104 locations, interior and exterior of the vehicle 102. It should be appreciated by those skilled in the art that the imager system 100 can include two or more imagers 104A-104G that are at one or more of the exemplary locations illustrated in FIG. 7, alternative locations interior or exterior of the vehicle 102, or a combination thereof. According to one embodiment, the imager system 100 can be used to display the image, control one or more vehicle components, the like, or a combination thereof. Examples of controlling a vehicle component can be a headlight activation system, a high beam/low beam activation system, a lane departure warning system, a pedestrian detection warning system, a blind zone indicator system, the like, or a combination thereof.

According to one embodiment, an imager system is provided and can be configured for use with a vehicle, said imager system comprising: a plurality of imagers comprising: a first imager having a first field of view, and configured to capture an image of at least a portion of said first field of view; and a second imager having a second field of view, and configured to capture an image of at least a portion of said second field of view, wherein said first field of view is approximately adjacent to said second field of view; a video processor module configured to approximately synchronize at least said first and second imagers, and further configured to process said captured images to be at least one of displayed and used to control a vehicle component; and a serial data communication connection communicatively connecting said plurality of imagers and said video processor module, wherein at least said first and second imagers are approximately synchronized by communicating a synchronization signal via a connection other than said serial data communication connection, and said images captured by said first and second imagers are approximately synchronized without buffering said captured images.

The imager system as described in one or more of the embodiments herein further comprising a dedicated synchronization communication connection communicatively connecting said plurality of imagers and said video processor module, wherein a synchronize signal is communicated via said dedicated synchronization communication connection.

The imager system as described in one or more of the embodiments herein further comprising power and ground connections communicatively connecting said plurality of imagers and said video processor module, wherein a synchronize signal is communicated via said power and ground connections.

The imager system as described in one or more of the embodiments herein, wherein said video processor module is configured to communicate said synchronize signal as a pulse on top of a direct current (DC) voltage of said power connection.

The imager system as described in one or more of the embodiments herein, wherein said video processor module is configured to synchronize at least a portion of said plurality of imagers by controlling power supplied to said plurality of imagers via said power connection.

The imager system as described in one or more of the embodiments herein, wherein an asynchronous communication backchannel is used in a closed loop to generate a synchronization signal locally at least a portion of said plurality of imagers, such that at least a portion of said imagers are approximately synchronized.

The imager system as described in one or more of the embodiments herein, wherein said video processor module is configured to generate a synchronization signal, and if said image captured by one or more of said plurality of imagers is captured before or after a tracking window period that is based upon said synchronization signal, said captured frame is ignored and timing of said corresponding imager is corrected.

The imager system as described in one or more of the embodiments herein, wherein said video processor module is further configured to incrementally correct an image capture timing sequence of one or more of said plurality of imagers if said captured image is captured within said tracking window but before or after a target window.

The imager system as described in one or more of the embodiments herein, wherein at least a portion of said plurality of imagers are approximately synchronized, such that an image captured by said first imager of at least a portion of said first field of view is processed so that data of said captured image is displayed with data from an image captured by said second imager of at least a portion of said second field of view, and said displayed data is substantially seamless.

The imager system as described in one or more of the embodiments herein, wherein a synchronization threshold is decreased as a speed of said plurality of imagers is decreased.

The imager system as described in one or more of the embodiments herein, wherein said image captured by said first imager of at least a portion of said first field of view and said image captured by said second imager of at least a portion of said second field of view are processed to at least one of display a bird's eye view of at least a portion of said first and second fields of view, and be used in a blind spot detection system.

The imager system as described in one or more of the embodiments herein, wherein at least a portion of said plurality of imagers are mounted on an exterior of the vehicle.

The imager system as described in one or more of the embodiments herein, wherein said serial connection is a parallel video data communication connection.

The imager system as described in one or more of the embodiments herein, wherein said serial data communication connection is a low-voltage differential signaling connection.

The imager system as described in one or more of the embodiments herein, wherein at least a portion of said plurality of imagers are high dynamic range imagers.

The imager system as described in one or more of the embodiments herein, wherein said first field of view being approximately adjacent to said second field of view comprises said first field of view partially overlapping said second field of view.

The imager system as described in one or more of the embodiments herein, wherein said first field of view being approximately adjacent to said second field of view comprises said first field of view being spaced from said second field of view by a non-imaged area.

According to another embodiment, an imager system is provided and can be configured for use with a vehicle, said imager system comprising: a plurality of imagers comprising: a first imager having a first field of view, and configured to capture an image of at least a portion of said first field of view; and a second imager having a second field of view, and configured to capture an image of at least a portion of said second field of view, wherein said first field of view is approximately adjacent to said second field of view; and a video processor module configured to approximately synchronize at least said first and second imagers, and further configured to process said captured images to be at least one of displayed and used to control a vehicle component; wherein an asynchronous communication backchannel is used in a closed loop to generate a synchronization signal locally at said first and second imagers, and at least said first and second imagers are approximately synchronized.

The imager system as described in one or more of the embodiments herein, wherein said images captured by said first and second imagers are processed without buffering said captured images.

The imager system as described in one or more of the embodiments herein, wherein said video processor module is configured to generate a synchronization signal, and if said image captured by one or more of said plurality of imagers is captured before or after a tracking window period that is based upon said synchronization signal, said captured frame is ignored and timing of said corresponding imager is corrected.

The imager system as described in one or more of the embodiments herein, wherein said video processor module is further configured to incrementally correct an image capture timing sequence of one or more of said plurality of imagers if said captured image is captured within said tracking window but before or after a target window.

The imager system as described in one or more of the embodiments herein, wherein said video processor module further comprises a clock, and said video processor module is configured to generate a pulse approximately at a start of an image frame based upon said clock.

The imager system as described in one or more of the embodiments herein, wherein at least a portion of said plurality of imagers further comprise a clock, and at least a portion of said plurality of imagers are configured to generate a pulse at a start of an image frame based upon said clock.

The imager system as described in one or more of the embodiments herein, wherein data relating to said clock and said pulse are communicated to said video processor module in image data communicated from said imager to said video processor module.

The imager system as described in one or more of the embodiments herein further comprising a serial data communication connection communicatively connecting said plurality of imagers and said video processor module, wherein said serial data communication connection is different than said asynchronous communication backchannel.

The imager system as described in one or more of the embodiments herein, wherein said serial data communication connection is a parallel video data communication connection.

The imager system as described in one or more of the embodiments herein, wherein said serial data communication connection is a low-voltage differential signaling connection.

The imager system as described in one or more of the embodiments herein, wherein at least a portion of said plurality of imagers are high dynamic range imagers.

The imager system as described in one or more of the embodiments herein, wherein said first field of view being approximately adjacent to said second field of view comprises said first field of view partially overlapping said second field of view.

The imager system as described in one or more of the embodiments herein, wherein said first field of view being approximately adjacent to said second field of view comprises said first field of view being spaced from said second field of view by a non-imaged area.

The imager system as described in one or more of the embodiments herein, wherein at least a portion of said plurality of imagers are approximately synchronized, such that an image captured by said first imager of at least a portion of said first field of view is processed so that data of said captured image is displayed with data from an image captured by said second imager of at least a portion of said second field of view, and said displayed data is substantially seamless.

The imager system as described in one or more of the embodiments herein, wherein a synchronization threshold is decreased as a speed of said plurality of imagers is decreased.

The imager system as described in one or more of the embodiments herein, wherein said image captured by said first imager of at least a portion of said first field of view and said image captured by said second imager of at least a portion of said second field of view are processed to at least one of display a bird's eye view of at least a portion of said first and second fields of view, and be used in a blind spot detection system.

The imager system as described in one or more of the embodiments herein, wherein at least a portion of said plurality of imagers are mounted on an exterior of the vehicle.

According to yet another embodiment, an imager system is provided and can be configured for use with a vehicle, said imager system comprising: a video processor module configured to be in communication with a plurality of imagers, said video processor module configured to approximately synchronize at least a portion of said plurality of imagers; and a low-voltage differential signaling communication connection of said video processor module, such that said video processor module is configured to be communicatively connected to at least a portion of said plurality of imagers, wherein at least a portion of said plurality of imagers are approximately synchronized without communicating a synchronization signal via said low-voltage differential signaling communication connection, and images captured by said plurality of imagers are approximately synchronized without buffering said captured images.

The imager system as described in one or more of the embodiments herein, wherein images captured by said first and second imagers are processed without buffering said captured images.

The imager system as described in one or more of the embodiments herein further comprising a dedicated synchronization communication connection of said video processor module, such that said video processor modules is configured to be communicatively connected to at least a portion of said plurality of imagers, wherein a synchronize signal is communicated via said dedicated synchronization communication connection.

The imager system as described in one or more of the embodiments herein further comprising power and ground connections of said video processor module, such that said video processor module is configured to be communicatively connected to at least a portion of said plurality of imagers, wherein a synchronize signal is communicated via said power and ground connection.

The imager system as described in one or more of the embodiments herein, wherein an asynchronous communication backchannel is used in a closed loop to generate a synchronization signal locally at least a portion of said plurality of imagers, such that at least a portion of said imagers are approximately synchronized.

The imager system as described in one or more of the embodiments herein, wherein said video processor module is configured to generate a synchronization signal, and if said image captured by one or more of said plurality of imagers is captured before or after a tracking window period that is based upon said synchronization signal, said captured frame is ignored and timing of said corresponding imager is corrected.

The imager system as described in one or more of the embodiments herein, wherein said video processor module is further configured to incrementally correct an image capture timing sequence of one or more of said plurality of imagers if said captured image is captured within said tracking window but before or after a target window.

The imager system as described in one or more of the embodiments herein, wherein at least a portion of said plurality of imagers are approximately synchronized, such that an image captured by said first imager of at least a portion of said first field of view is processed so that data of said captured image is displayed with data from an image captured by said second of at least a portion of said second field of view, and said displayed data is substantially seamless.

The imager system as described in one or more of the embodiments herein, wherein a synchronization threshold is decreased as a speed of said plurality of imagers is decreased.

The imager system as described in one or more of the embodiments herein, wherein said image captured by said first imager of said first field of view and said image captured by said second imager of said second field of view are processed to at least one of display a bird's eye view of at least a portion of said first and second fields of view, and be used in a blind spot detection system.

The imager system as described in one or more of the embodiments herein, wherein at least a portion of said plurality of imagers are mounted on an exterior of the vehicle.

The imager system as described in one or more of the embodiments herein, wherein said serial connection is a parallel video data communication connection.

The imager system as described in one or more of the embodiments herein, wherein said serial data communication connection is a low-voltage differential signaling connection.

The imager system as described in one or more of the embodiments herein, wherein at least a portion of said plurality of imagers are high dynamic range imagers.

The imager system as described in one or more of the embodiments herein, wherein said first field of view being approximately adjacent to said second field of view comprises said first field of view partially overlapping said second field of view.

The imager system as described in one or more of the embodiments herein, wherein said first field of view being approximately adjacent to said second field of view comprises said first field of view being spaced from said second field of view by a non-imaged area.

Advantageously, the imager system 100 and method 200 allow for the imagers 104 to be substantially synchronized so that the digitally received image data does not have to be buffered. Thus, there can be a reduction in memory requirements due to the reduced need for frame buffering, there is reduced latency due to frame buffering, and synchronization can be useful when aligning and splicing scene data from multiple imagers when dynamically changing objects are visible by both imagers. For example, a guardrail observed by both a side facing imager 104A and a rear-facing camera 104B should match approximately seamlessly across a splice when forming a panoramic view. It should be appreciated by those skilled in the art that the system 100 and method 200 can have additional or alternative advantages. It should further be appreciated by those skilled in the art that the above-described components can be configured in additional or alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An imager system configured for use with a vehicle, said imager system comprising:
   a plurality of imagers comprising:
      a first imager having a first field of view, and configured to capture an image of at least a portion of said first field of view; and
      a second imager having a second field of view, and configured to capture an image of at least a portion of said second field of view, wherein said first field of view is approximately adjacent to said second field of view, wherein said first field of view partially overlapping said second field of view;
   a video processor module configured to approximately synchronize at least said first and second imagers, and further configured to process said captured images to be at least one of displayed and used to control a vehicle component;
   a serial data communication connection communicatively connecting said plurality of imagers and said video processor module, wherein at least said first and second imagers are approximately synchronized by communicating a synchronization signal via a connection other than said serial data communication connection, and said images captured by said first and second imagers are approximately synchronized without buffering said captured images, wherein an asynchronous communication backchannel is used in a closed loop to generate a synchronization signal locally at said first and second imagers, such that at least said first and second imagers are approximately synchronized.

2. The imager system of claim 1 further comprising a dedicated synchronization communication connection communicatively connecting each of at least said first and second imagers and said video processor module, wherein a synchronize signal is communicated via said dedicated synchronization communication connection.

3. The imager system of claim 1 further comprising power and ground connections communicatively connecting each of at least said first and second imagers and said video processor module, wherein a synchronize signal is communicated via said power and ground connections.

4. The imager system of claim 3, wherein said video processor module is configured to communicate said synchronize signal as a pulse on top of a direct current (DC) voltage of said power connection.

5. The imager system of claim 3, wherein said video processor module is configured to synchronize said first and second imagers by controlling power supplied to at least said first and second imagers via said power connection.

6. The imager system of claim 1, wherein said video processor module is configured to generate a synchronization signal, and if said image captured by one or more of said plurality of imagers is captured before or after a tracking window period that is based upon said synchronization signal, said captured frame is ignored and timing of said corresponding imager is corrected.

7. The imager system of claim 1, wherein at least said first and second imagers are approximately synchronized, such that an image captured by said first imager of at least a portion of said first field of view is processed so that data of said captured image is displayed with data from an image captured by said second imager of at least a portion of said second field of view, and said displayed data is substantially seamless.

8. The imager system of claim 7, wherein a synchronization threshold is decreased as a speed of said plurality of imagers is decreased.

9. The imager system of claim 1, wherein said image captured by said first imager of at least a portion of said first field of view and said image captured by said second imager of at least a portion of said second field of view are processed to at least one of display a bird's eye view of at least a portion of said first and second fields of view, and be used in a blind spot detection system.

10. The imager system of claim 1, wherein said serial data communication connection is a low-voltage differential signaling connection.

11. An imager system configured for use with a vehicle, said imager system comprising:
a plurality of imagers comprising:
a first imager having a first field of view, and configured to capture an image of at least a portion of said first field of view; and
a second imager having a second field of view, and configured to capture an image of at least a portion of said second field of view, wherein said first field of view is approximately adjacent to said second field of view, wherein said first field of view partially overlapping said second field of view; and
a video processor module configured to approximately synchronize at least said first and second imagers, and further configured to process said captured images to be at least one of displayed and used to control a vehicle component; wherein an asynchronous communication backchannel is used in a closed loop to generate a synchronization signal locally at said first and second imagers, and at least said first and second imagers are approximately synchronized.

12. The imager system of claim 11, wherein said video processor module is configured to generate a synchronization signal, and if said image captured by one or more of said plurality of imagers is captured before or after a tracking window period that is based upon said synchronization signal, said captured frame is ignored and timing of said corresponding imager is corrected.

13. The imager system of claim 11, wherein said video processor module further comprises a clock, and said video processor module is configured to generate a pulse approximately at a start of an image frame based upon said clock.

14. The imager system of claim 11, wherein at least said first and second imagers further comprise a clock, and at least said first and second imagers are configured to generate a pulse at a start of an image frame based upon said clock.

15. The imager system of claim 14, wherein data relating to said clock and said pulse are communicated to said video processor module in image data communicated from said imager to said video processor module.

16. An imager system configured for use with a vehicle, said imager system comprising:
a video processor module configured to be in communication with a plurality of imagers, said video processor module configured to approximately synchronize at least a portion of said plurality of imagers each having a field of view adjacent and partially overlapping a field of view of another of said plurality of imagers; and
a low-voltage differential signaling communication connection of said video processor module, such that said video processor module is configured to be communicatively connected to at least a portion of said plurality of imagers, wherein at least a portion of said plurality of imagers are approximately synchronized without communicating a synchronization signal via said low-voltage differential signaling communication connection, and images captured by said plurality of imagers are approximately synchronized without buffering said captured images.

17. The imager system of claim 16 further comprising a dedicated synchronization communication connection of said video processor module, such that said video processor module is configured to be communicatively connected to at least a portion of said plurality of imagers, wherein a synchronize signal is communicated via said dedicated synchronization communication connection.

18. The imager system of claim 16 further comprising power and ground connections of said video processor module, such that said video processor module is configured to be communicatively connected to at least a portion of said plurality of imagers, wherein a synchronize signal is communicated via said power and ground connection.

19. The imager system of claim 16, wherein an asynchronous communication backchannel is used in a closed loop to generate a synchronization signal locally at at least a portion of said plurality of imagers, such that at least a portion of said imagers are approximately synchronized.

* * * * *

UNITED STATES PATENT AND TRADEMARK OFFICE
CERTIFICATE OF CORRECTION

PATENT NO. : 8,717,433 B2  
APPLICATION NO. : 13/083772  
DATED : May 6, 2014  
INVENTOR(S) : Harold C. Ockerse Page 1 of 1

It is certified that error appears in the above-identified patent and that said Letters Patent is hereby corrected as shown below:

In the Specification

Col. 8, line 42;

"is" should be --µs--;

Col. 15, line 24;

"a" should be --at--.

Signed and Sealed this  
Third Day of February, 2015

Michelle K. Lee  
*Deputy Director of the United States Patent and Trademark Office*